Dec. 14, 1965  R. A. FINDLAY  3,222,880
FRACTIONAL CRYSTALLIZATION CONTROL SYSTEM
Filed Jan. 3, 1963
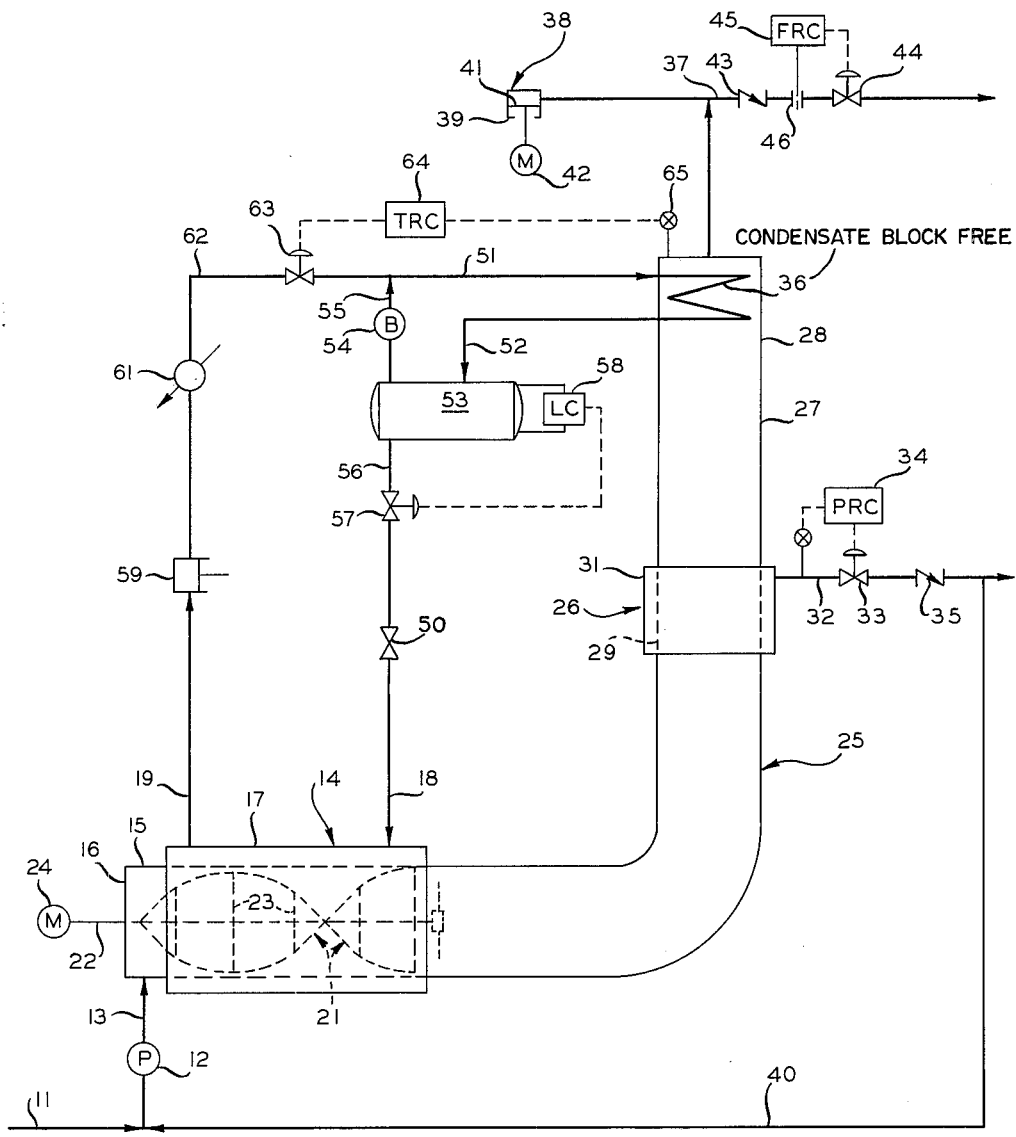
INVENTOR.
ROBERT A. FINDLAY
BY *Young & Quigg*
ATTORNEYS

United States Patent Office 3,222,880
Patented Dec. 14, 1965

3,222,880
FRACTIONAL CRYSTALLIZATION
CONTROL SYSTEM
Robert A. Findlay, Bartlesville, Okla., assignor to Phillips
Petroleum Company, a corporation of Delaware
Filed Jan. 3, 1963, Ser. No. 249,279
9 Claims. (Cl. 62—58)

This invention relates to method and apparatus for separating the components of a fluid mixture by means of fractional crystallization. In one aspect the invention relates to method and means for concentrating an aqueous solution with concomitant production of water separated from the solution. In another aspect the invention relates to the recovery of fresh water from sea water. In yet another aspect the invention relates to the concentration of aqueous solutions and dispersions such as orange juice, beer, milk and the like. In another aspect the invention relates to method and apparatus for controlling the rate of addition of heat in a melting zone of a fractional crystallization purification system. In still another aspect the invention relates to method and apparatus for controlling the temperature in a zone. In another aspect the invention relates to a method for the transfer of heat in fractional crystallization.

Purification by means of fractional crystallization has been known for a number of years. Schmidt Re. 23,810 (1954) discloses a process and apparatus for purifying crystals, which process involves moving a mixture of crystals and adhering liquid through a liquid removal zone, a reflux zone and a melting zone, withdrawing part of the melt as product and forcing another part of the melt in a direction countercurrent to the movement of crystals in said reflux zone. This process is generally applicable to the separation of at least one pure component from any mixture which is resolvable into its components by fractional crystallizaton. For example, the process can be used for the concentration of fruit juices, vegetable juices, and other materials which comprise aqueous solutions which can be concentrated by the formation and removal of ice crystals. The process is also of great value in the resolution of non-aqueous mixtures, an example of such an application being the separation of para-xylene from a mixture thereof with other xylene isomers.

Previously the crystals have been melted by the application of heat to the melting section of the purification column by means of a suitable heating element, such as a heat exchange coil or an electrical heater, disposed inside the melting section and in heat exchanging relationship therewith, or by means for effecting direct heat exchange between a suitable fluid, such as warm butane, and the contents of the melting section. In general, the prior art systems maintained the rate of introduction of heat into the melting section at a substantially constant value and permitted the purified product withdrawal rate to vary. However, in order to obtain and maintain optimum production of purified product, it has become desirable to withdraw the purified product at a substantially constant rate. Difficulties have been encountered in maintaining the desired constant withdrawal rate of purified product due to various fluctuations within the system such as channeling of melt liquid through a void in the crystal bed.

It has been discovered that these difficulties can be substantially reduced, if not eliminated, and the desired constant rate of withdrawal of purified product can be maintained by controlling the addition of heat to the contents of the melting section responsive to the temperature of the melt although the reason for this is not presently understood. It is desirable that the addition of heat to the contents of the melting section be substantially uniform over the cross section of the melting section to insure stability of the purification column and to prevent channeling of the crystal bed due to uneven heat distribution. When only the sensible heat of a heating fluid (i.e., no phase change occurs) is utilized in an indirect heat exchanger, a considerable temperature drop exists across the heat exchanger coil, resulting in uneven heat distribution. When the latent heat of vaporization of a heating fluid is utilized in an indirect heat exchanger with substantial or complete condensation of vapor to liquid, considerable difficulties are encountered due to liquid collecting at low points blocking the heating coil as well as causing variations in the heat transfer rate.

In accordance with the present invention there is provided method and apparatus for providing a substantially uniform distribution of heat in a melting zone and thus a more accurate control of the temperature of the melt, wherein a heating fluid in its gaseous state substantially at its dew point is passed in indirect heat exchange with the melt in the melting section at a sufficiently high velocity so that only a portion, generally less than 25 weight percent, preferably less than 15 weight percent, and more preferably less than 10 weight percent, of the heating fluid is condensed. Also in accordance with the invention there is provided a method for employing the same heat exchange liquid for refrigerating the incoming feed to form crystals and for subsequently melting the crystals in the purification column.

Accordingly, it is an object of the invention to provide an improved method and apparatus for effecting the separation of components of a mixture. Another object of the invention is to provide method and means for obtaining optimum production of purified product. A further object of the invention is the provision of method and means for maintaining a substantially constant rate of withdrawal of purified product. A still further object of the invention is to maintain the temperature of the melt from a crystal purification column substantially constant. It is an object of the invention to provide method and apparatus for effecting and maintaining a uniform distribution of heat in a heat exchange zone. Another object of the invention is to maintain a uniform temperature across a heat exchange surface. Yet another object of the invention is to eliminate or at least substantially reduce the occurrence of liquid blocks in a conduit of a heat exchanger. Another object of the invention is to provide an improved method for extracting heat from the incoming feed to the crystallizer and for adding heat to the purification column.

Other objects, aspects and advantages of the invention will be apparent from a study of the disclosure, the drawing, and the appended claims to the invention.

Referring now to the drawing there is shown a schematic representation of a crystal purification system embodying the invention. A feed mixture comprising two or more components, one of which is separable from the mixture by crystallization, is passed through conduit 11 and is forced by means of pump 12 through conduit 13 into chilling section 14. Chilling section 14 comprises an inner cylindrical shell 15 one end of which is closed by means of an end member 16, and a cooling jacket 17 having an inlet conduit 18 and an outlet conduit 19. Agitating or scraping means 21 is positioned within cylindrical shell 15 and is designed to prevent the accumulation of solid material on the inner surface of cylindrical shell 15. Scraping means 21 can be constructed of strips of metal or other suitable material known in the art and can be fabricated in the form of a helix, as shown in the drawing, or can be straight. Any suitable form of scraping means 21 can be provided. Scraping means 21 is mounted on a rotatable shaft 22 by means of members 23. Shaft 22 is axially positioned within cylindrical shell 15 and is connected to a suitable source of power, such as motor 24, which rotates the scraping means. Shaft 22 is suitably sealed in end member 16 by means of a packing gland of any type shown in the art. Cooling of the feed which enters chilling section 14 can be provided by passing a suitable coolant, such as described hereinafter, through inlet conduit 18 and withdrawing the coolant through outlet conduit 19. Sufficient cooling in chilling section 14 is provided so that a predetermined amount of solid crystals is produced from the feed passing therethrough. The resulting slurry of crystals in mother liquid is passed into purification column 25 which comprises filsolid crystals is produced from the feed passing theretration section 26, a reflux section 27, and a melting section 28. Filtration section 26 comprises a suitable filter screen or medium 29 and an external shell 31, the latter being provided with an outlet pipe 32 through which the filtrate, that is, the mother liquor is passed. Filter medium 29 can be of any desired type known in the art. For example, it can comprise a metallic screen, a sintered perforate metal member or a perforate metal member supporting a filter cloth. It is desirable that the filter medium 29 be positioned integrally with respect to the adjacent wall of reflux section 27. Although filtration section 26 has been illustrated in the drawing as being an external filter, it is within the scope of the invention to utilize an internal filter, in which event, external shell 31 could be positioned integrally with respect to the wall of reflux section 27, and filter medium 29 would be disposed within shell 31 and preferably positioned axially with respect to purification column 25. The filtrate produced in filtration section 26 is removed from purification column 25 through conduit 32. Conduit 32 can contain a suitable means of maintaining a predetermined back pressure, such as valve 33 which is regulated by pressure recorder controller 34 responsive to the pressure in conduit 32. A check valve 35 can be provided in conduit 32 to prevent the back flow of withdrawn filtrate. If desired, a portion of the mother liquor can be passed by way of conduit 40 to the inlet of pump 12 as a portion of the feed thereto.

The crystal mass is passed into reflux section 27 wherein it is countercurrently contacted with liquid reflux as subsequently described. As the crystal mass approaches heating element 36 in melting section 28, the crystals are melted. A portion of the melt produced by heat from heating element 36 is withdrawn through product withdrawal conduit 37 as a purified product of the process. The remainder of the melt is forced back into reflux section 26 to form reflux which effects crystal purification. Column 25 is provided with a pulsation producing means 38 which can be operatively connected to product withdrawal conduit 37, as shown in the drawing, or to any other suitable point in the purification column, such as to melting section 28, reflux section 27, conduit 13, or the section of the column 25 between chiller 14 and filtration section 26. Pulsation producing means 38 comprises a cylinder 39, one end of which is in fluid communication with the purified product withdrawal conduit 37 and reciprocal piston 41 mounted within cylinder 39. Piston 41 is suitably sealed in cylinder 39 by any suitable means to prevent leakage of the purified product. Reciprocation of piston 41 is produced by any suitable means, for example, by a motor 42 having suitable cams associated therewith. While the crystal mass is being advanced from chilling section 14 through filtration section 26 and reflux section 27 into melting section 28, piston 41 is reciprocated at a suitable rate, such as in the range from about 50 to about 400 pulsations per minute, so that a pulsating pressure is exerted on the melt reflux which is intermittently forced back, countercurrently with respect to the crystal mass, through reflux section 27. A check valve 43 can be provided in product withdrawal line 37 downstream of pulsation producing means 38 to prevent the back flow of withdrawn product into the crystal purification column 25. If desired, check valve 43 can be replaced or augmented by a suitable valve, such as a solenoid valve, which is cyclically opened and closed in synchronism with the movement of piston 41. The rate of withdrawal of purified product through conduit 37 can be set at a substantially constant rate by means of valve 44 which is actuated by flow rate controller 45 responsive to the pressure drop across an orifice 46 in conduit 37.

A suitable heat exchange fluid, for example ammonia, is passed in its gaseous state substantially at its condensation temperature through conduit 51 into the inlet of heating element 36 wherein a portion of the heat exchanging fluid, generally less than 25 weight percent, more preferably less than 15 weight percent, and still more preferably less than 10 weight percent, is condensed. The fluid comprising the condensed liquid and the remaining uncondensed gas is withdrawn from heating element 36 and is passed by way of conduit 52 into accumulator 53. The uncondensed gas in accumulator 53 is withdrawn therefrom by a blower 54 and passed by way of conduit 55 into conduit 51. Blower 54 thus serves to maintain a high rate of flow of saturated gas through heating element 36. This high rate of flow of uncondensed gas in combination with the low percentage of the gas which is condensed serves to sweep the condensed liquid through the heating element 36, thus preventing the accumulation of liquid pockets within the heating element 36. The liquid is withdrawn from accumulator 53 and passed by way of conduit 56, valve 57, expansion valve 50, and conduit 18 into jacket 17 of chiller 14. Valve 57 can be actuated by a liquid level controller 58 which is operatively connected to accumulator 53 to maintain the level of the liquid in accumulator 53 substantially constant at a predetermined value. Expansion valve 50 reduces the pressure on the liquid, thereby permitting it to boil at a lower temperature in chiller 14. The liquid is vaporized in its passage through jacket 17 and the thus produced gas is withdrawn from jacket 17 by way of conduit 19 and passed to a compressor 59. The thus compressed gas is passed through cooler 61 to remove the superheat from the compressed gas, thus cooling it to its dew point or saturation temperature. The saturated gas is passed by way of conduit 62 and valve 63 into conduit 51 wherein the saturated gas is admixed with the gas from conduit 55. In a presently preferred embodiment valve 63 is actuated by temperature recorder controller 64 responsive to the temperature of the melt in melting section 28 as indicated by temperature sensing device 65. The manipulation of valve 63 varies the pressure in element 36 and thus the amount of gas condensed to obtain the desired temperature as measured by temperature sensing means 65. Since blower 54 supplies more gas than is thus condensed, a high ratio of gas to liquid condensate is maintained in element 36. This insures condensation of gas throughout the element 36, thus maintaining the entire element at the dew point temperature of the gas. The sweeping action of the uncondensed gas eliminates the formation of liquid pockets within element 36. This uniform temperature in turn insures uniform melting of the crystal bed. Non-uniform temperatures on the other hand would cause "hot-spots" which would result in uneven melting of the bed and consequent channelling of reflux melt through the bed.

It is within the contemplation of the invention to utilize temperature recorder controller 64 to operate a valve, not shown, in conduit 51 or valve 57 instead of valve 63. Temperature recorder controller 64 can also manipulate a pressure recorder controller (not shown) which in turn manipulates valve 63. It is within the contemplation of the invention for temperature sensing device 65 to be positioned in heat measuring relationship with the fluid in either melting section 28 or product withdrawal conduit 37. While the invention has been illustrated in the presently preferred embodiment in utilizing the liquid from accumulator 53 as the cooling fluid in chiller 14, it is within the contemplation of the invention to revaporize the liquid from accumulator 53 in any suitable manner. If desired chiller 14 can be provided with one or more additional sections utilizing other sources of cooling fluids instead of or in addition to a section utilizing the liquid from accumulator 53. It is also within the contemplation of the invention to utilize an external heater, for example, a heating jacket, encompassing melting section 28. Such an external heating jacket can be provided with an indirect heat exchanging coil which can be operated in parallel with heating element 36, if desired, or can be provided with any other suitable means for heating, such as an electrical heater. The introduction of heat into the external heating jacket can be maintained at a substantially constant rate or can be controlled by temperature recorder controller 64, as desired.

As a general rule, the solids content of the mixture fed from the chiller into the purification column is within the range of about 20 to about 50 weight percent, and preferably in the range of about 30 to about 40 weight percent. However, solids contents outside the stated ranges can be utilized.

The invention is applicable to the solution of non-aqueous mixtures, an example of which being the separation of para-xylene from a mixture thereof with other xylene isomers. The invention is also applicable to the production of fresh water from brine and to the concentration of other aqueous solutions, examples of which include fruit juices, vegetable juices, beer, milk and the like.

While the invention has been described as utilizing ammonia as the heat exchange fluid, it is within the scope of the invention to utilize any suitable heat exchange fluid. Examples include butane, propane, isobutane, various polychlorofluoromethanes (Freons), halogenated hydrocarbons such as ethyl chloride, and the like. The particular flow rate of the heat exchange fluid through the blower can vary with differences in factors such as the shape and capacity of the heat exchanger, the percentage of the heat exchange fluid which is to be condensed, and the like, but should be sufficient to sweep the condensed liquid through the heat exchanger Similarly the percentage of the heat exchange liquid which is condensed can vary, but should be sufficiently low to permit the uncondensed gas to sweep the condensed liquid through the heat exchanger and sufficiently high to provide the desired heat transfer.

The following example is presented in further illustration of the invention but is not to be construed unduly in limitation thereof.

EXAMPLE

In order to describe the process of this invention in greater detail, reference is made to a specific procedure for concentration of beer. The feed stream of the beer to be concentrated is supplied through conduits 11 and 40, pump 12, and conduit 13 into chiller 14. The beer is chilled in chiller 14 until the temperature is reduced to about 14° F. The slurry removed from chiller 14 contains about 37 weight percent ice crystals The ice crystals are permitted to grow and are eventually introduced into column 25. The mother liquor removed through conduit 32 is at a temperature of about 14° F.

The material balance of the system based on introduction of feed at the rate of 107 gallons per hour is set forth in the following table.

Table

| Component | Beer Feed | Recycle M.L. | Chiller Feed | Column Feed | Column Mother Liquor | Concentrate Product | Water |
|---|---|---|---|---|---|---|---|
| Conduit | 11 | 40 | 13 | | 32 | | 37 |
| Ethyl Alcohol [1] | 34 | 136 | 170 | 170 | 170 | 34 | Tr |
| Soluble Solids [1] | 45 | 180 | 225 | 225 | 225 | 45 | Tr |
| Water (liquid) [1] | 813 | 592 | 1,405 | 739 | 739 | 147 | 666 |
| Water (ice) [1] | | | | 666 | | | |
| Total, lb./hr | 892 | 908 | 1,800 | 1,800 | 1,134 | 226 | 666 |
| G.p.h. (flowing) | 107 | 109 | 216 | 223 | 136 | 27 | 80 |
| Weight percent ice | | | | 37.0 | | | |
| Weight percent alcohol | 3.96 | 18.7 | 10.8 | | 18.7 | 18.7 | 0.05 |
| Temperature, °F | 40 | 14 | 23 | 14 | 14 | 14 | 40 |
| B.p.h.[2] | 3.5 | 3.5 | 7.0 | 7.2 | 4.4 | 0.9 | 2.6 |

[1] Lb./hr.
[2] Barrels per hour.

The ammonia vapor from the chiller 14 is compressed to 100 p.s.i.a. and a temperature of 165° F. in compressor 59. Cooler 61 reduces the temperature of the superheated ammonia vapor to its dew point of 55° F. The saturated vapor then flows as required through control valve 63 into line 51 to which is also added 2082 pounds of saturated ammonia vapor at 95 p.s.i.a. and 53° F. Approximately 218 pounds per hour of the combined vapor stream is condensed in melter 36 in melting the ice and maintaining the required melt temperature of 50° F. as measured by temperature sensing means 65. Thus only 218/2300=9% of the vapor is condensed in coil 36. This insures a high ratio of vapor to liquid in the coil, vapor condensing in all parts of the coil, and a uniform coil temperature corresponding to the saturation temperature of the vapor. The condensed vapor is withdrawn from accumulator 53 at the rate of about 218 pounds per hour, expanded to a pressure of 24 p.s.i.a. and passed to chiller 14 where it completes the cycle.

Reasonable variation and modification are possible within the scope of the foregoing disclosure, the drawing and the appended claims to the invention.

I claim:

1. In a process in which crystals and adhering mother liquor are continuously passed as a slurry from a chilling zone through a filtering zone from which a stream of mother liquor is withdrawn, the crystals and remaining mother liquor are passed from said filtering zone into a reflux zone, the crystals are passed from said reflux zone into a melting zone, heat is introduced into said melting zone to melt the crystals to obtain a melt by passing a heat exchange fluid in indirect heat exchanging relationship with the crystals, a portion of the melt is withdrawn from the melting zone as a product stream, and the remainder of the melt is passed countercurrently to the movement of crystals as reflux therefrom; the improvement comprising passing said heat exchange fluid in a vaporous state substantially at the condensation temperature thereof in indirect heat exchanging relationship with the crystals at such a rate of flow that only a portion of said heat exchange fluid is condensed, the uncondensed portion being sufficiently great to sweep the condensed portion through the indirect heat exchange with the crystals and eliminate the formation of pockets of said condensed portion, providing a uniform temperature of said heat exchange fluid throughout said indirect heat exchange with the crystals.

2. A process in accordance with claim 1 wherein said portion of said heat exchange fluid which is condensed is less than 25 weight percent.

3. A process in accordance with claim 1 wherein said portion of said heat exchange fluid which is condensed is less than 10 weight percent.

4. A process in accordance with claim 1 further comprising establishing a signal representative of the temperature of said melt and manipulating the rate of flow of said heat exchange fluid responsive to said signal.

5. A process in accordance with claim 4 wherein said product stream is withdrawn from said melting zone at a substantially constant rate.

6. A process in which a liquid multi-component mixture containing at least one component which crystallizes first upon cooling of said mixture is passed through a chilling zone and therein is chilled to produce a slurry of crystals and adhering mother liquor, said slurry is withdrawn from said chilling zone and passed through a filtering zone from which a stream of mother liquor is withdrawn, the crystals and any remainnig mother liquor are passed from said filtering zone to a reflux zone, the crystals are passed from said reflux zone into a melting zone, heat is introduced into said melting zone to melt a portion of the crystals to obtain a melt by passing a heat exchange fluid in indirect heat exchanging relationship with the crystals, a portion of the melt is withdrawn from the melting zone as a product stream, and the remainder of the melt is passed countercurrently to the movement of crystals as reflux; the improvement comprising passing said heat exchange fluid in a saturated vaporous state in indirect heat exchanging relationship with the crystals in said melting zone to melt a portion of the crystals and thereby condense a portion of said heat exchange fluid, the portion of said heat exchange fluid which is thus condensed being less than about 25 weight percent of said heat exchange fluid which is passed in indirect heat exchanging relationship with the crystals, separating the heat exchange fluid which has been passed in indirect heat exchanging relationship with the crystals into a condensed liquid portion and an uncondensed gas portion, vaporizing said condensed liquid portion to produce vaporous heat exchange fluid, combining the thus produced vaporous heat exchange fluid with said uncondensed gas portion to form heat exchange fluid in a saturated vaporous state to be passed in indirect heat exchanging relationship with crystals in said melting zone, establishing a signal representative of the temperature of said melt, and controlling the rate at which said vaporous heat exchange fluid in a saturated vaporous state is passed in indirect heat exchange relationship with the crystals in said melting zone responsive to said signal.

7. A process in accordance with claim 6 wherein said condensed liquid portion is vaporized by passing said condensed liquid portion through said chilling zone in indirect heat exchange relationship with said mixture.

8. A crystal purification apparatus for resolution of a liquid multi-component mixture containing at least one component which crystallizes first upon cooling of said mixture comprising a purification column having a filtering section, a reflux section, and a melting section; chilling means for converting said mixture into a slurry of crystals and mother liquor; means for introducing the said mixture into said chilling means; means for passing the resulting slurry from said chilling means to said filtering section; an indirect heat exchange means positioned in heating relationship with the contents of said melting section, said indirect heat exchange means having an inlet and an outlet; an accumulator; means connecting said outlet of said indirect heat exchange means to said accumulator; means for withdrawing uncondensed gas from said accumulator and passing the thus withdrawn uncondensed gas into said inlet of said indirect heat exchange means at a rate of flow sufficient to sweep the liquid which is condensed in said indirect heat exchange means through said indirect heat exchange means and into said accumulator; means for withdrawing the condensed liquid from said accumulator; means for vaporizing the thus withdrawn condensed liquid to produce vaporous heat exchange fluid at its condensation temperature; means for passing the thus produced vaporous heat exchange fluid into said inlet of said indirect heat exchange means; means for establishing a signal representative of the temperature of the melt; and means for controlling the rate of flow of said thus produced vaporous heat exchange fluid into said inlet of said indirect heat exchange means responsive to said signal.

9. Apparatus in accordance with claim 8 wherein said means for vaporizing comprises means for passing the thus withdrawn condenser liquid through said chilling means in indirect heat exchanging relationship with the mixture contained therein.

References Cited by the Examiner

UNITED STATES PATENTS

| | | | |
|---|---|---|---|
| 1,931,347 | 10/1933 | Gay | 62—238 X |
| 2,613,513 | 10/1952 | Shields. | |
| 2,666,304 | 1/1954 | Ahrel. | |
| 2,854,494 | 9/1958 | Thomas. | |
| 2,894,997 | 7/1959 | Hachmuth. | |
| 2,895,835 | 7/1959 | Findlay. | |
| 2,981,773 | 4/1961 | Weedman. | |
| 3,132,096 | 5/1964 | Walton | 62—58 X |
| 3,142,969 | 10/1964 | Stoller | 62—58 |

NORMAN YUDKOFF, *Primary Examiner.*